(12) United States Patent
Lothe

(10) Patent No.: US 7,526,923 B2
(45) Date of Patent: *May 5, 2009

(54) DEVICE FOR CONDENSING VOLATILE ORGANIC COMPOUNDS FROM A STORAGE OR TRANSPORT TANK INTO OIL

(75) Inventor: Per Lothe, Forresfjorden (NO)

(73) Assignee: Knutsen OAS Shipping AS (NO)

( * ) Notice: Subject to any disclaimer, the term of this patent is extended or adjusted under 35 U.S.C. 154(b) by 340 days.

This patent is subject to a terminal disclaimer.

(21) Appl. No.: 10/540,355

(22) PCT Filed: Dec. 22, 2003

(86) PCT No.: PCT/NO03/00433

§ 371 (c)(1),
(2), (4) Date: Feb. 2, 2006

(87) PCT Pub. No.: WO2004/057231

PCT Pub. Date: Jul. 8, 2004

(65) Prior Publication Data

US 2006/0150638 A1    Jul. 13, 2006

(30) Foreign Application Priority Data

Dec. 23, 2002   (NO) .................................. 20026183

(51) Int. Cl.
*F17C 5/02* (2006.01)
*E03B 11/00* (2006.01)
*F17D 1/00* (2006.01)
*B01D 47/02* (2006.01)
*B01F 5/04* (2006.01)

(52) U.S. Cl. .............................. 62/47.1; 137/591; 261/76
(58) Field of Classification Search .................. 62/46.1, 62/47.1, 48.2; 137/592, 591; 96/274, 276, 96/243, 267; 261/76
See application file for complete search history.

(56) References Cited

U.S. PATENT DOCUMENTS

| 652,463 | A | * | 6/1900 | McCreery | 261/111 |
| 1,506,708 | A | * | 8/1924 | Wolfe | 137/591 |
| 2,059,942 | A | * | 11/1936 | Lovell | 62/98 |

(Continued)

FOREIGN PATENT DOCUMENTS

NO    19996471    12/1999

(Continued)

*Primary Examiner*—William C Doerrler
(74) *Attorney, Agent, or Firm*—Andrus, Sceales, Starke & Sawall, LLP

(57) ABSTRACT

A device for condensing volatile organic compounds (VOC) from a storage or transport tank (4) into oil from the same or another storage or transport tank (4) via a downcomer (6), where the upper part (8) of the downcomer (6), which upper part has a cross sectional area that is essentially unreduced, is connected to a gas pipe (14), the gas pipe (14) communicating with the upper part (16) of the storage or transport tank (4), and where the upper part (8) of the downcomer (6) is arranged at a sufficient height above the upper part (16) of the storage or transport tank (4) to cause an inflow of gas from the upper part (16) of the storage or transport tank (4) due to the underpressure created in the upper part (8) of the downcomer (6) when oil flows down through the downcomer (6).

10 Claims, 2 Drawing Sheets

U.S. PATENT DOCUMENTS

| | | | |
|---|---|---|---|
| 2,938,360 A * | 5/1960 | Christensen | 62/48.2 |
| 2,944,405 A | 7/1960 | Basore et al. | |
| 3,003,325 A | 10/1961 | Poethig et al. | |
| 3,068,657 A | 12/1962 | Allen | |
| 3,108,447 A * | 10/1963 | Maher et al. | 62/47.1 |
| 3,369,371 A * | 2/1968 | Holly et al. | 62/48.2 |
| 3,453,836 A * | 7/1969 | Kerry | 62/47.1 |
| 3,733,838 A * | 5/1973 | Delahunty | 62/48.2 |
| 4,249,387 A * | 2/1981 | Crowley | 62/48.2 |
| 5,076,822 A * | 12/1991 | Hewitt | 62/632 |
| 6,852,142 B2 * | 2/2005 | Varshovi | 65/216 |
| 7,228,871 B2 * | 6/2007 | Lothe | 137/592 |
| 2001/0042377 A1 * | 11/2001 | Pozivil | 62/48.3 |

FOREIGN PATENT DOCUMENTS

WO      WO 99/34106      7/1999

* cited by examiner

DEVICE FOR CONDENSING VOLATILE ORGANIC COMPOUNDS FROM A STORAGE OR TRANSPORT TANK INTO OIL

CROSS REFERENCE TO RELATED APPLICATION

The present application is the U.S. national stage application of International Application PCT/NO2003/000433, filed Dec. 22, 2003, which international application was published on Jul. 8, 2004 as International Publication WO 2004/057231. The International Application claims priority of Norwegian Patent Application 20026183, filed Dec. 23, 2002.

BACKGROUND OF THE INVENTION

This invention regards a device for reducing the proportion of volatile organic compounds VOC that separates out from oil, especially during transport in large tanks, such as is common e.g. during sea transport.

Crude oil normally contains fractions of light and heavy gases that, due to their volatility, cannot be transported with the liquid fraction of the crude oil. In terms of the technical aspects of the transport, it would be favourable if the crude oil were separated into a gas fraction, a liquid gas fraction and a liquid fraction. However, separating and transporting petroleum products from a production field in three fractions involves considerable extra costs, and as such the crude oil is normally separated into a gas fraction and a liquid fraction. The liquid gas phase is therefore divided into a lighter fraction to be transported with the gas fraction and a heavy fraction to be transported with the liquid fraction.

When transporting a liquid petroleum fraction containing heavy gases such as propane and butane at a moderate gauge pressure of the order of 1.05 to 1.07 bar, gases will continuously evaporate from the liquid fraction. To avoid a pressure increase in the transport tanks, the evaporating gases, i.e. the volatile organic compounds, must be drawn off from the tanks and sent to combustion or a reinjection plant.

NO 19996471 concerns a downcomer provided with a venturi, the venturi being designed to condense already separated gases from a cargo hold. By using a venturi to increase the fluid velocity and thereby the underpressure, unnecessary evaporation of VOC is anticipated due to the relatively low pressure.

SUMMARY OF THE INVENTION

The object of the invention is to remedy the disadvantages of prior art.

The object is achieved in accordance with the invention, by the characteristics given in the description below and in the following claims.

A downcomer is provided from a level above the deck of the ship and down into the ship's cargo tank, preferably ending up near the bottom section of the cargo tank. Fluid is pumped from the cargo tank and up to the upper part of the downcomer. When the oil flows into the upper end portion of the downcomer and is accelerated by gravity, a lower total pressure is created in the upper part of the downcomer. This underpressure can be reduced by introducing gas into the upper part of the downcomer. According to the invention, this gas is made up of already evaporated gas from the void above the liquid cargo in the cargo tank.

The upper part of the downcomer is disposed at a height that ensures a sufficient drop in the downcomer, even with a full cargo tank.

The so-called Froude number is known from the fluid mechanics of open pipes. The Froude number Fr, which is dimensionless, is defined as the ratio between the force of inertia and the force of gravity acting on a fluid:

$$Fr = \frac{V}{\sqrt{gh_m}}$$

Where V=fluid velocity in metres per second, g=Earth's gravity in metres per second$^2$, and $h_m$=the mean hydraulic depth.

Replacing the hydraulic depth $h_m$ in the formula with the diameter D of the downcomer produces an expression that has proven to be appropriate for the selection of suitable downcomers.

The development work carried out has shown that the absorption of VOC gases into the oil is satisfactory when the value of the expression $$Fr = \frac{V}{\sqrt{gD}}$$

is between 1 and 2.

Thus the diameter of the downcomer is chiefly dependent on the velocity of the inflowing fluid.

BRIEF DESCRIPTION OF THE DRAWINGS

In the following, a description is given of a non-limiting example of a preferred device illustrated in the accompanying drawings, in which.

DETAILED DESCRIPTION OF THE INVENTION

Figure 1:
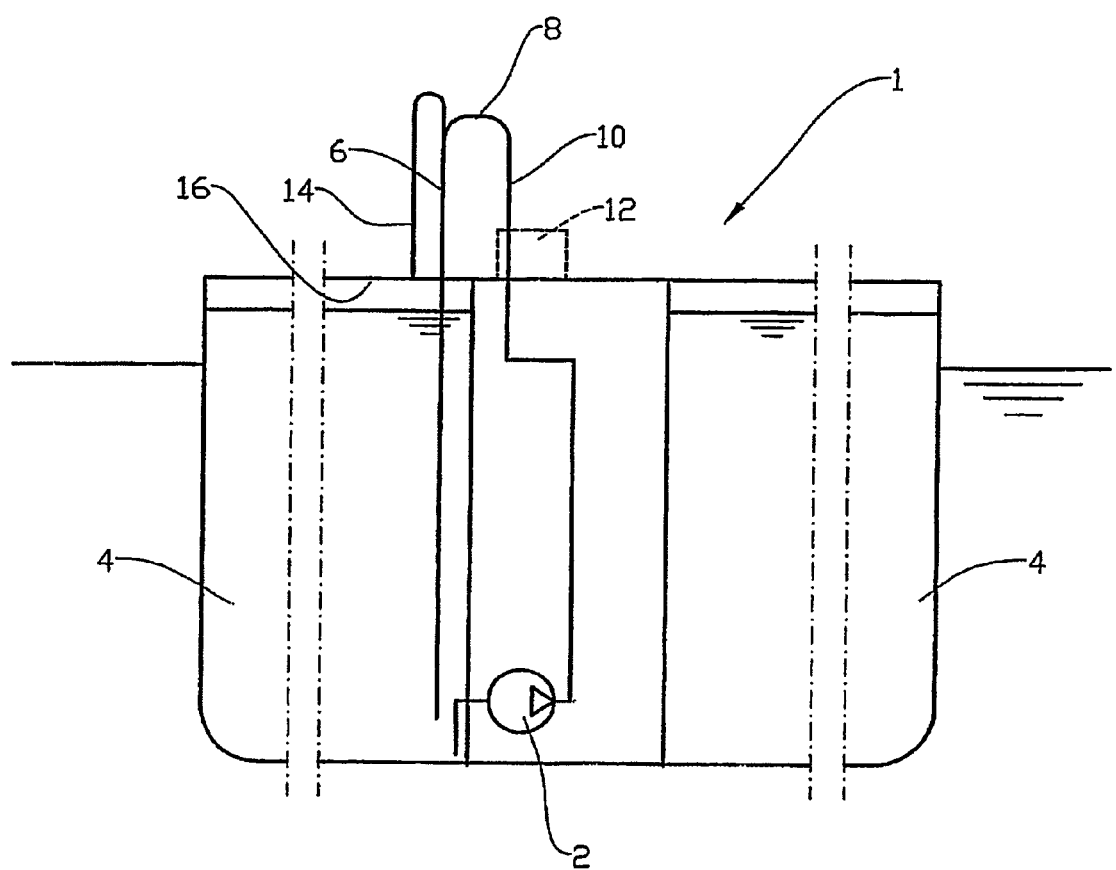
FIG. 1 schematically shows an arrangement in which the oil is pumped from the cargo tank of a tanker to the upper part of the downcomer.
Figure 2:
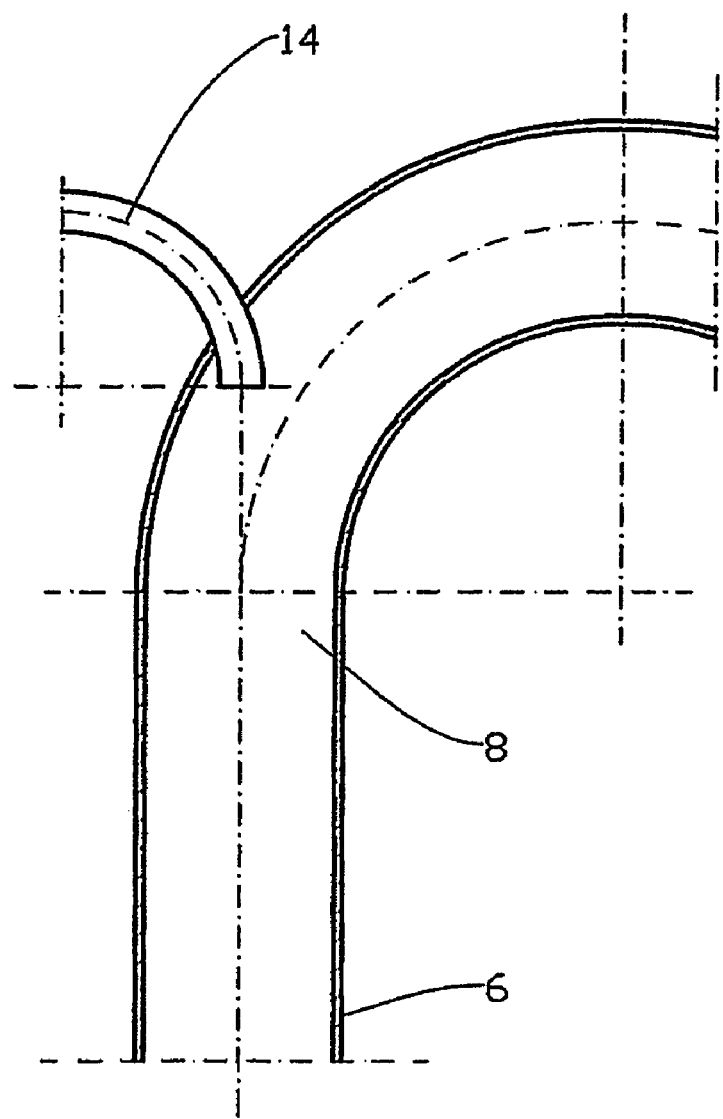
FIG. 2 shows the upper part of the downcomer on a larger scale.

In the drawings, reference number 1 denotes a tanker. A pump 2 is connected to one or more of the ship's cargo tanks 4 and arranged so as to pump oil from the cargo tank 4 up to the upper part 8 of a downcomer 6 via a pipe 10. If so desired, the pipe 10 can be connected to a cooling unit 12 in order to improve the condensation process in the downcomer 6.

A gas pipe 14 runs from the upper part 16 of the cargo tank 4 to the upper part 8 of the downcomer 6.

The upper end 8 of the downcomer 6 projects far enough above the upper part 16 of the cargo tank 4 to create a sufficient underpressure at the end portion 8, even when the cargo tank 4 is filled up.

The pump 2 is started and oil flows from the bottom of the cargo tank 4 via the pipe 10, and possibly via the cooling unit 12, up to the upper part 8 of the downcomer 6. When the oil flows down through the downcomer 6, the gravitational force, which seeks to increase the falling velocity in the downcomer 6, will give rise to a reduced total pressure by the upper part 8 of the downcomer 6.

Gas located in the upper part 16 of the cargo tank 4 will then be drawn through the gas pipe 14, which is appropriately dimensioned, and into the upper part 8 of the downcomer 6, where the inflow of gas prevents the build-up of a relatively large underpressure in the upper part 8. The inflowing gas is mixed with and condensed into the oil as it flows down through the downcomer.

The intake of gases from the gas pipe 14 at the upper part 8 of the downcomer 6 is, according to the invention, only due to the underpressure that is created as a result of the inflowing oil falling down through the downcomer 6. Emphasis is placed on avoiding reductions in the cross section of the downcomer 6, as such reductions will cause VOC to separate out of the oil.

Moving transport tanks are more susceptible to evaporation of VOC, but the device according to the invention is equally well suited for use with stationary storage tanks.

The invention claimed is:

1. A device for condensing volatile organic compounds (VOC) from a storage or transport tank into oil from the same or another storage or transport tank via a downcomer directing flow, wherein the upper part of the downcomer, which upper part defines a flow path having a cross sectional area perpendicular to the direction of flow that is substantially unreduced, is connected to a gas pipe, the gas pipe communicating with the flow path, and where the upper part of the downcomer is arranged at a sufficient height above the upper part of the storage or transport tank to cause an inflow of gas from the upper part of the storage or transport tank to the flow path due to the underpressure being created in the upper part of the downcomer when oil flows down through the downcomer.

2. A device in accordance with claim 1, comprising a cooler arranged upstream of the upper part of the downcomer so that the oil will flow through said cooler prior to flowing into the upper part of the downcomer.

3. A device for condensing volatile organic compounds from a storage or transport tank into oil in the same or another storage or transport tank, the device comprising:
   a tank having a lower section for holding oil and an upper section for holding volatile organic compounds associated with the oil;
   a downcomer directing flow into the tank and having an upper part and having a lower end in communication with the lower section of the tank, the upper part being located at a predetermined height above the upper section of the tank and defining a flow path having a substantially constant cross sectional area perpendicular to the direction of flow; and
   a gas pipe connected to the flow path;
   wherein the predetermined height is sufficient to cause an inflow of gas from the upper section of the tank to the flow path when gravity causes oil to flow from the upper part of the downcomer to the second end of the downcomer.

4. The device of claim 3, wherein the downcomer defines a flow path having a substantially constant cross section perpendicular to the direction of flow from the upper part to the lower end.

5. The device of claim 3, comprising a pipe connecting the upper part of the downcomer to the lower section of the tank.

6. The device of claim 5, comprising a pump configured to pump oil from the lower section of the tank to the upper part of the downcomer.

7. The device of claim 5, comprising a cooler configured to cool oil flowing into the upper end of the downcomer.

8. The device of claim 7, wherein the cooler is connected to the pipe.

9. The device of claim 3, wherein the upper part of the downcomer is curved and the gas pipe is tangentially connected to the upper part of the downcomer.

10. A method for condensing volatile organic compounds from a storage or transport tank into oil in the same or another storage or transport tank, the method comprising the steps of:
    causing oil to flow into an upper part of a downcomer that is located at a predetermined height above the storage or transport tank, the downcomer defining a flow path having a substantially constant cross sectional area perpendicular to the direction of flow;
    allowing gravity to accelerate the oil down the flow path of the downcomer from the upper part to a lower end that is in communication with the storage or transport tank; and
    providing a gas pipe connecting gas in the storage or transport tank to the upper part of the downcomer;
    wherein the predetermined height is such that gravity creates a sufficient underpressure in the upper part of the downcomer to draw gas from the storage or transport tank into the upper part of the downcomer.

* * * * *